(12) United States Patent
Kannan et al.

(10) Patent No.: US 7,154,941 B2
(45) Date of Patent: Dec. 26, 2006

(54) MODEM HAVING A VECTOR-ARCHITECTURE PROCESSOR, AND ASSOCIATED METHODOLOGY THEREFOR

(75) Inventors: Anand Kannan, Irving, TX (US); Gang Xu, Denton, TX (US); Sridhar Rajagopal, Houston, TX (US)

(73) Assignee: Nokia Corporation, Espoo (FI)

( * ) Notice: Subject to any disclaimer, the term of this patent is extended or adjusted under 35 U.S.C. 154(b) by 675 days.

(21) Appl. No.: 10/186,319

(22) Filed: Jun. 28, 2002

(65) Prior Publication Data

US 2004/0001535 A1 Jan. 1, 2004

(51) Int. Cl.
*H04B 1/38* (2006.01)
(52) U.S. Cl. .................................... 375/222
(58) Field of Classification Search ............. 375/219, 375/222, 295, 316, 341, 262, 265; 712/32, 712/34–36, 213
See application file for complete search history.

(56) References Cited

U.S. PATENT DOCUMENTS

| | | | | |
|---|---|---|---|---|
| 5,473,600 A | * | 12/1995 | Liu | 370/286 |
| 6,252,902 B1 | * | 6/2001 | Simeon et al. | 375/222 |
| 6,310,910 B1 | * | 10/2001 | Shah et al. | 375/222 |
| 6,505,290 B1 | * | 1/2003 | Moyer et al. | 712/34 |
| 6,549,577 B1 | * | 4/2003 | Florencio et al. | 375/240.21 |

OTHER PUBLICATIONS

A.V. Oppenheim et al., Descrete-Time Signal Processing, Prentice Hall, 1st edition 1992, pp. 5-6, 548, 560, 581-584, 587-622, 632-640.

N. Weste et al., "VLSI for OFDM", IEEE Communications Magazine, Oct. 1998, pp. 127-131.

T.T. Lee et al., "Parallel Routing Algorithms in Benes-Clos Networks," Proceedings of IEEE INFOCOM, vol. 1, pp. 279-286, Mar. 1996, San Fransisco, CA.

D. Nassimi et al., "Parallel Algorithms to Set Up the Benes Permutation Network," IEEE Transactions on Computers, vol. C-31, No. 2, Feb. 1982, pp. 148-154.

R. Thomas et al., "Efficient FFTs on IRAM", Proceedings of the first Workshop on Media Processors and DSPs, in Conjunction with the 32 nd Annual International Symposium on Microarchitecture, Haifa, Israel, Nov. 1999.

D.T. Harper III, "Block, Multistride Vector and FFT Accesses in Parallel Memory Systems", IEEE Transactions on Parallel and Distributed System, vol. 2, No. 1, Jan. 1991, pp. 43-51.

G.S. Sohi, "High-bandwidth Interleaved Memories for Vector Processors—A Simulation Study, " IEEE Transaction on Computers, vol. 42, No. 1, Jan. 1993, pp. 34-44.

H. Lou, "Implementing the Viterbi Algorithm", IEEE Signal Processing Magazine, Sep. 1995, pp. 42-52.

D.E. Hocevar et al. "Achieving Flexibility in a Viterbi Decoder DSP Coprocessor", 52nd IEEE Vehicular Technology Conference, pp. 2257-2264, Sep. 2000, Boston MA.

(Continued)

*Primary Examiner*—Khanh Tran
(74) *Attorney, Agent, or Firm*—Banner & Witcoff, Ltd.

(57) ABSTRACT

Apparatus, and an associated method, for operating upon data communicated during operation of a communication system. A vector processor is provided for a modem (MOdulator/DEModulator), and the modem functionality is effectuated through the execution of algorithms at the vector processor. The algorithms are vectorized and stored at a memory device. The algorithms are accessed and provided to parallel processing devices of the vector processor and are executed thereat. The modifiability and scalability of the modem is significantly improved relative to conventional modem devices.

19 Claims, 4 Drawing Sheets

OTHER PUBLICATIONS

P.G. Gulak et al., "Locally Connected VLSI Architectures for the Viterbi Algorithm", IEEE Journal on Selected Areas in Communication, vol. 6, No. 3, pp. 527-537, Apr. 1998.

C.B. Shung et al., "Area-efficient Architectures for the Viterbi Algorithm—Part 1: Theory", IEEE Transactions on Communications, vol. 41, No. 4, pp. 634-644, Apr. 1993.

C.B. Shung et al., "Area-efficient Architectures for the Viterbi Algorithm—Part 2: Applications", IEEE Transactions on Communications, vol. 41, No. 5, pp. 802-807, May 1993.

D. Akopian et al., "Multistage Interconnection Networks for k/n Rate Viterbi Decoders", in Proc. IEEE Global Telecommunications Conference (GLOBECOM'98), Sydney, Australia, Nov. 8-12 1998, vol. 2, pp. 845-849.

J. Nikara et al., "Unified Pipeline Architecture for In-Order 8×8 DCT and IDCT", accepted to $5^{th}$ World Mutliconference on Systemics, Cybernetics and Informatics, Orlando, FL, U.S.A., Jul. 22-25, 2001.

J. Takala et al., "Pipeline Architecture for 8/spl times/8 cosine Transform", Acoustics, Speech and Signal Processing, 2000. ICASSP '00. Proceedings. 2000 IEEE International Conference on Acoustics, Speech and Signal Processing, vol. 6, 2000, pp. 3303-3306.

T. Jarvinen et al., "Unified Architecture for Discrete Fourier and Cosine Transform", in Advances in Systems Science: Measurement and Control, N.E. Mastorakis and L.A. Pecorelli-Peres, Eds., pp. 301-306. WSES Press, New York, NY, U.S.A., 2001.

Hui-Ling Lou et al., "An Instruction Set for A Programmable Signal Processor Dedicated to Viterbi Detection", VLSI Technology, Systems, and Application, 1991. Proceedimgs of Technical Papers, 1991, International Symposium on VLSI Technology, Systems, and Application, 1991, pp. 247-251.

Lou, H. et al., "A Programmable Parallel Processor Architecture for Viterbi Detection", Global Telecommunications Conferenc, 1990, and Exhibition. 'Communications: Connecting the Future', GLOBECOM '90., IEEE, 1990, pp. 1333-1337, vol. 2.

Patterson and Hennessey, "Computer Architecture", Morgan Kauffmann, 1996, Appendix B.

* cited by examiner

MODEM HAVING A VECTOR-ARCHITECTURE PROCESSOR, AND ASSOCIATED METHODOLOGY THEREFOR

The present invention relates generally to a manner by which to operate upon data at a modem, or other communication device, that forms part of a radio, or other, communication system. More particularly, the present invention relates to apparatus, and an associated method, for the modem, or other communication device, by which Fourier and Viterbi operations are performed through the use of a unified, vector-architecture processor. Algorithms that perform the Fourier and Viterbi operations are vectorized, forming vectorized algorithms, to facilitate their execution by a vector processor. When implemented at a demodulator part of the modem, Fast Fourier Transforming (FFT) and Viterbi decoding operations are performed. A modem, or other communication device, of improved programmability and scalability is provided.

BACKGROUND OF THE INVENTION

Advancements in communication and processing technologies have permitted the development, and implementation, of new types of communication systems. Generally, increased data rates of communication are permitted as a result of such advancements. Increasingly large amounts of data are permitted to be communicated within a selected time period.

New types of communication services, requiring high data throughput rates are possible in such new types of communication systems. Multimedia communication services are exemplary of new types of communication services, permitted now due to such communication-technology advancements. And, many other types of communication services are similarly also possible in communication systems constructed to take advantage of the communication technology advancements.

New-generation cellular, and other radio, communication systems are developed to provide for packet-based communications. Most multimedia communication services are predicated upon packet-based communications. Other communication services are analogously also migrating towards packet-based communications. Different types of communication schemes are used, or proposed for use, in such new communication systems. For instance, at least one WLAN (wireless local area network), to be operable pursuant to a variant of the IEEE (Institute of Electrical and Electronic Engineers) 802.11 specification proposes to utilize OFDM (orthogonal frequency division multiplexing) techniques. OFDM effectively forms a hybrid of a multi-carrier modulation (MCM) and frequency shift keying (FSK) modulation. Frequency-divided carrier frequencies are defined in an OFDM system such as the proposed, WLAN, and the carriers are selected to be orthogonal to one another, such as by separating the carriers by integer multiples of the inverses of symbol durations of parallel bit streams that are to be applied thereto. The orthogonal carriers are transmitted simultaneously, thereby permitting an entire allocated channel to be occupied through an aggregated sum of narrow, orthogonal subbands.

The WLAN, operational pursuant to the variant of the IEEE 802.11 standard. Packet-based communication schemes generally utilize digital communication techniques, and communication stations operable in many packet-based communication systems require the utilization of modems (MOdulators/DEModulators). While operation of modems vary, depending upon the type of communication scheme in which the modems are to be operable, certain characteristics of the modems are important. Characteristics include the cost, size, complexity, programmability, scalability, simplicity, and modifiability of the modem.

Existing modem constructions are sometimes categorized according to their general operational features.

One modem-type category forms a data-flow style modem. Such a modem construction is formed of fixed circuits. The fixed circuits are interconnected by way of fixed connections, and the circuits are driven by a common, centrally-controlled timing circuit. The fixed circuits generally are operable in only one manner, e.g., a circuit is capable of executing only a single algorithm. While acceptable for many implementations, a conventional, data-flow construction is unable readily to be modified, is generally of relatively large physical dimensions, is relatively power-consumptive, and exhibits difficulty of design maintenance. Lack of programmability and scalability are disadvantageous from an economic viewpoint and further adaptability.

Another modem-type category forms a DSP-style modem, i.e., a modem that utilizes a DSP (digital signal processor) in its construction. This type of modem is of improved programmability characteristics relative to a data-flow modem type. That is to say, the details of the modem are contained in software code and data arrangement, all storable in a memory device rather than in a particular interconnection of fixed circuits. However, the specialized nature of the DSP, and hardware structures ancillary thereto, limit the modifiability of the modem constructed therefrom. While more modifiable than a data-flow style modem construction, this modem type also lacks full programmability. A modem of this construction type also cannot therefore be modified easily.

Execution of modem-function algorithms at a processor having a vector architecture would be advantageous as the speed at which the operations can be effectuated would be increased. Fast Fourier Transforming and Viterbi decoding in the demodulator part of the modem would particularly be facilitated.

To date, however, a modem construction type has not been provided that fully takes advantage of the features of a processor having a vector architecture. If a modem utilizing such a processor could be provided modem operation would be facilitated and improved programmability and scalability to the modem would be provided.

A modem construction type utilizing such a vector architecture would be particularly advantageously implemented in a communication system that utilizes OFDM.

It is in light of this background information related to modem operation that the significant improvements of the present invention have evolved.

SUMMARY OF THE INVENTION

The present invention, accordingly, advantageously provides apparatus, and an associated method, by which to transform and code data that is communicated during operation of a radio, or other, communication system.

Through operation of an embodiment of the present invention, a manner is provided for a modem, or other communication device, by which to perform, e.g., Fourier transform and Viterbi decoding operations through the use of a unified, vector-architecture processor.

Algorithms that perform the Fourier transform and Viterbi decoding operations, as well as others, are vectorized, forming vectorized algorithms to facilitate their execution by parallel, vector processing devices. A modem of improved programmability and scalability is thereby provided.

In one aspect of the present invention, a modem includes a memory storage element for storing indicia associated with algorithms to be executed by parallel processors of a vector processor. The algorithms stored at the memory storage device are vectorized algorithms, vectorized in a manner to permit their execution in a parallel fashion by the processors of the vector processing architecture.

In another aspect of the present invention, the vectorized algorithms stored at the memory device are accessed through operation of a scalar processor. The scalar processor accesses the indicia and, responsive thereto, the indicia is selectably forwarded on to the vector processors. Selection is made at the scalar processor whether to forward on the indicia to the processing devices of the vector processor responsive to, e.g., values contained in selected fields into which the data forming the indicia is formatted. If the values in the field are of first selected values, the indicia is forwarded on to the processing devices. If the values contained in the selected field are of second selected values, the indicia is operated upon by the scalar processor in conventional manner. The fields containing the values, used by the scalar processor to determine whether to forward on the indicia to the processing devices or to operate upon the indicia thereat, are formed of unclassified fields defined in the associated formatting scheme.

In another aspect of the present invention, the vectorized algorithms are formed in manners such that the indicia forwarded on to the parallel processing devices are forwarded to each of the processing devices in unison so that common operations are performed by each of the processing devices of the vector processors.

The algorithms, vectorized and stored at the memory device, when executed, perform fast Fourier transform operations upon data provided to the modem. And, additional algorithms further perform, when executed by the parallel processing devices, Viterbi decoding operations.

Memory banks are positioned to receive data that is to be operated upon by the modem. The data is buffered at storage locations of the memory bank, to be retrieved therefrom and operated upon during execution of the algorithms by the parallel processing devices. The scalar core processor further operates to generate access signals to address selected lines of the memory bank.

In another aspect of the present invention, the vector processor further includes a permutation network for permuting data operated upon during operation of the processing devices of the vector processor as well as a vector register bank/file. The scalar core processor further operates to generate pattern signals for application to the permutation network to control permutation of the data provided thereto. And, the scalar core processor generates register number signals that are applied to the vector register bank.

Because the algorithms stored at the memory device are vectorized algorithms, capable of execution at parallel vector processors of a vector processor instructed pursuant to a unified, vector architecture, improved modem operation is possible. The complex computations required to perform the operations of modem operation are carried more quickly than many conventional modem-construction types. And, because the vectorized algorithms are software-implemented, the algorithms are readily modifiable. Changes to the algorithms are readily implementable merely by substituting, or overwriting, the indicia contained at the memory device. And, scalability of operation of the modem is also much-improved relative to conventional modem devices.

In these and other aspects, therefore, apparatus, and an associated method, is provided for a modem. The modem selectably operates upon digital data, and the digital data is transformed and coded, either by encoding or decoding, during operation of the modem. An instruction memory contains indicia associated with algorithms that operate to effectuate the transforming and coding of the digital data. A vector processor is formed of a first processing device and at least a second processing device. The first and at least second processing devices of the vector processor are positioned in parallel with one another to permit parallel operation. The vector processor executes the algorithms, the indicia which are stored at the instruction memory device, that effectuate the transforming and coding of the digital data.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
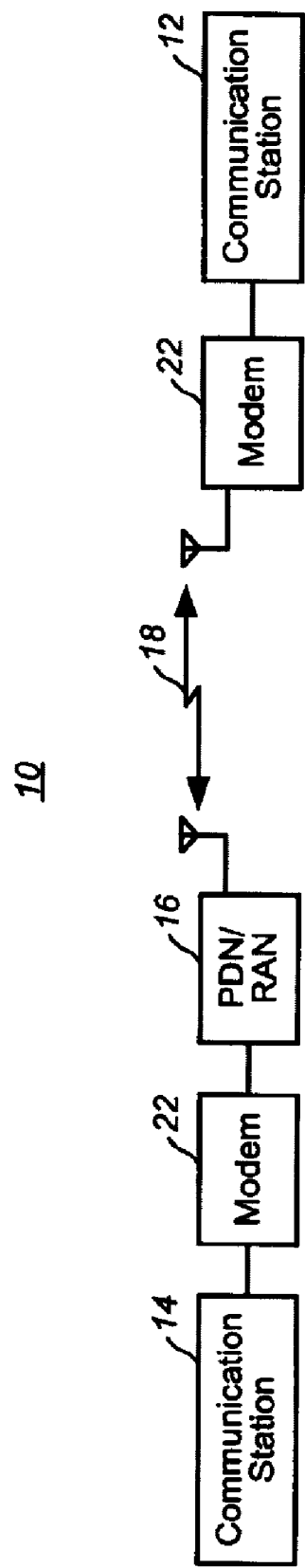
FIG. 1 illustrates a functional block diagram of a communication system that includes an embodiment of the present invention as a portion thereof.

Referring first to FIG. 1, a communication system, shown generally at 10, provides for the communication of data between communication stations, here a communication station 12 and a communication station 14. In the exemplary implementation, the communication system 10 forms a radio communication station, more particularly, a cellular communication system. While the following description shall describe exemplary operation of the communication system of its exemplary implementation as a cellular communication system, operation of an embodiment of the present invention is analogously also implementable in other types of communication systems, both radio communication systems and wireline communication systems.

The communication system includes a network part 16, here representative of a packet data network and a radio frequency section (RF)). And, a radio link 18 is formed to extend between the network part and the communication station 12. For purposes of illustration, the communication station 12 forms a mobile station operable in the wireless Local Area Network (LAN) communication system, and the communication station 14, as illustrated, forms a network-connected communication station.

Modems 22 of an embodiment of the present invention are coupled to the communication stations 12 and 14. The modems are functionally represented. In an actual implementation, the elements of the modem are implemented in any desired manner and are located at any appropriate location. The functionality of the modems 22 are, for instance, in an actual implementation, embodied within the structure of the respective communication stations 12 and 14, respectively. The modems here each are operable to operate upon data originating at, and terminating at, the communication station with which the modems are respectively associated.

Data is transported upon a communication channel, defined upon the radio link 18, and then delivered to a communication station. The modem at the receiving station operates to perform fast Fourier transforms (FFTs) upon the data. And, then, Viterbi decoding operations are performed upon the data, once transformed by the fast Fourier transforming operations. Thereafter, the data is forwarded to the communication station for further processing thereon.

Data originated at a communication station, i.e., the sending station, to be transported upon the radio link 18, is operated upon by the modem associated therewith to convert the data into a form to permit its communication upon communication channels formed upon the radio link. The data is encoded by convolutional encoding operations. And, then, inverse fast Fourier transforms are performed upon the data, once encoded.

An embodiment of the present invention utilizes a vector processor formed of a unified, vector architecture to facilitate modem operation to perform the modem functions of the modem. Through operation of the modem implemented in the manner of the present invention, improved modifiability and scalability of the modem is permitted.

Figure 2:
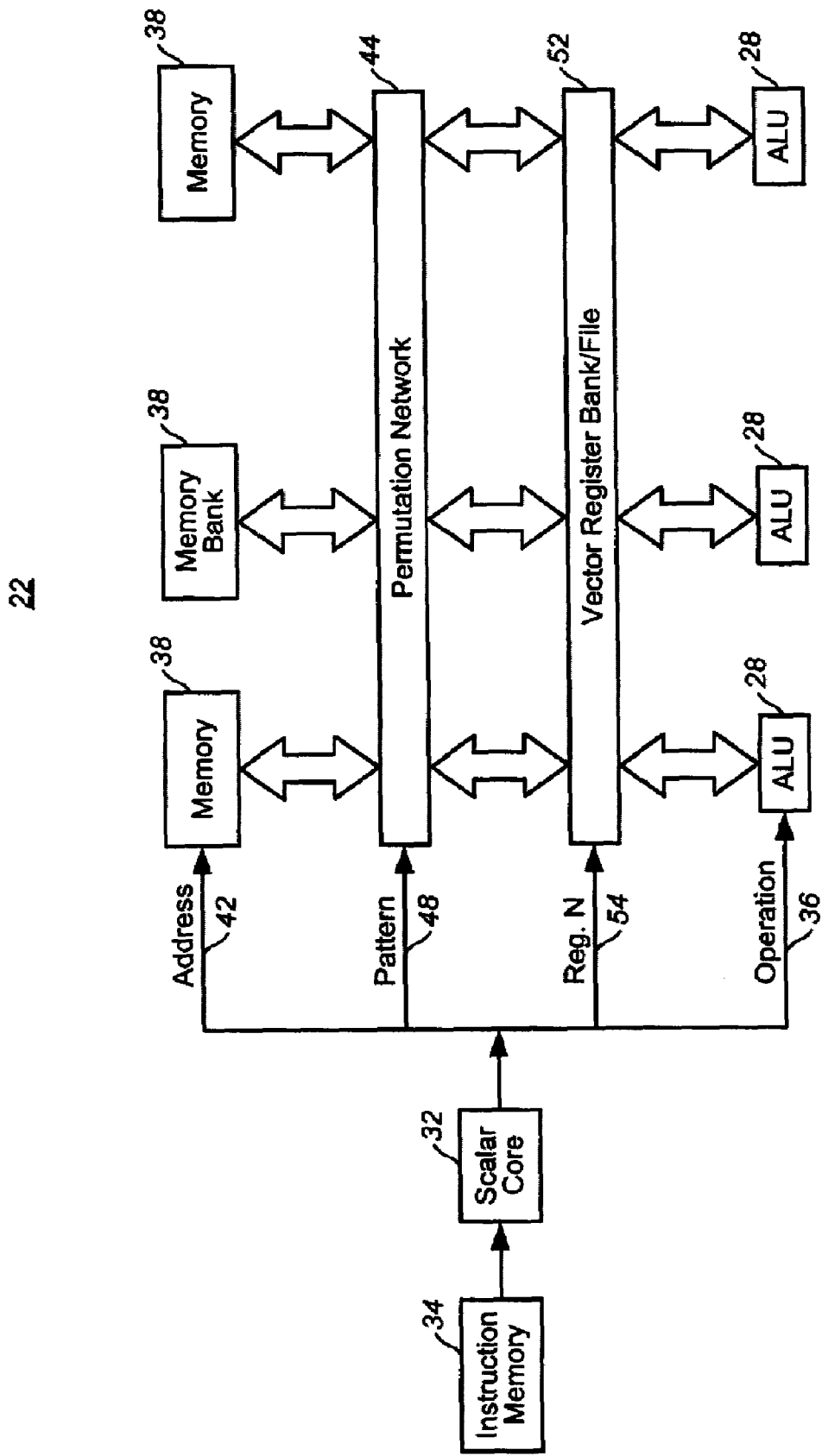
FIG. 2 illustrates a functional block diagram of the apparatus of an embodiment of the present invention that forms a part of the modem of the communication system shown in FIG. 1.

Turning next to FIG. 2, portions of a modem 22 of an embodiment of the present invention are shown. Here, the modem is formed of a unified, vector architecture having a plurality of arithmetic logic units (ALUs) 28 that form parallel processors, operable in unison, in manners conventional of a vector processor-arrangement.

The modem also includes a scalar core processor 32 and an instruction memory element 34 having memory locations accessible by the scalar core processor. The memory device 34 includes vectorized algorithms of an embodiment of the present invention that are permitting of execution by the parallel-positioned ALUs 28. When forming the receiver part of the modem, the vectorized algorithms stored at the memory device include, at least, an FFT (Fast Fourier Transform) algorithm and a Viterbi decoder algorithm. The indicia is formatted according to a formatting scheme such that the scalar core processor passes on the indicia to the arithmetic logic units. Values contained in an unclassified field, e.g., are used by the scalar core processor when deciding in what manner to make use of the stored indicia. When of appropriate values, the indicia is forwarded to the ALUs, here indicated by way of a bus line 36.

The modem is further shown to include a memory bank cache 38 at which data that is to be operated upon by the modem is cached. Additional instructions generated by the scalar core processor, here by way of a bus line 42, permit selective address of the memory devices of the memory bank cache 38. Thereby, signals generated by the scalar core processor on the control address line 42 determine what portions of the data provided to the modem are operated upon by the ALUs 28.

The vector processor is further shown to include a permutation network 44 coupled to the memory bank cache 38 to receive the data cached thereat and addressed by generation of the signals on the control address line 42. The permutation network operates to permute the data provided thereto by a selected permutation pattern. The permutation network is also coupled by way of a bus line 48 to receive pattern commands to control the permutation pattern by which the permutation network operates. The pattern control command is generated by the scalar core processor on the bus line.

The vector processor shown in the figure further includes a vector register bank/file 52 coupled to the permutation network to receive the data, once permutated thereat and also to the arithmetic logic units. Data, once permutated, is provided to the vector register bank. The vector register bank/file is further coupled to receive a register number command generated on the bus line 54, generated by the scalar core processor 32. Responsive to values of the registration number command, the data contained at the vector register bank/file is provided to the arithmetic logic units to be operated thereon.

By vectorizing the Viterbi decoding and Fast Fourier Transform algorithms, the transforming and decoding operations can be performed by the arithmetic logic units of the vector processor arrangement. Increased speed of transforming and decoding operations are possible through the use of the parallel processor arrangement. And, because the algorithms are software-implemented, the algorithms are easily modified or replaced to modify thereby operation of the modem.

Figure 3:
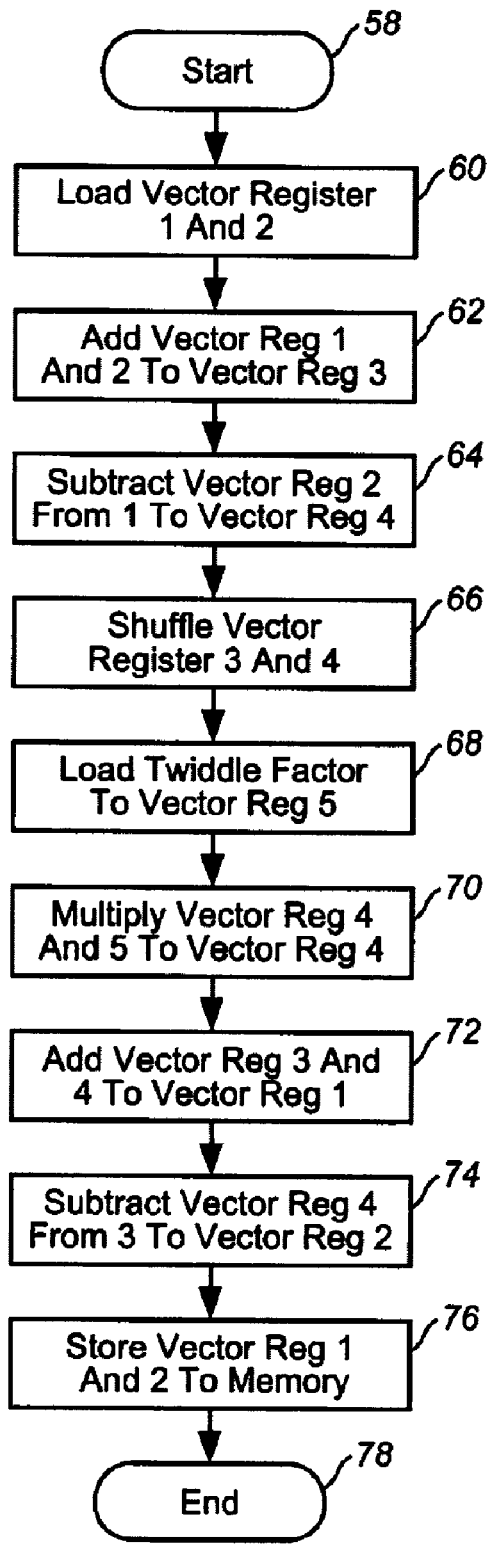
FIG. 3 illustrates a process diagram representative of exemplary operation of an embodiment of the present invention.

FIG. 3 illustrates a process, shown generally at 56, representative of exemplary operation of a modem 22, shown in FIG. 2. First, after start, indicated by the start block 58, vector registers, here indicated as registers 1 and 2, of the vector register bank/file 52 (shown in FIG. 2) are loaded. Then, and as indicated by the block 62, values contained in the vector registers 1 and 2 are added to a third vector register, identified as register 3, of the vector register bank 52.

Then, and as indicated by the block 64, the contents of the vector register 2 are subtracted from the contents of the vector register 1 and added to a vector register, indicated as register 4, of the vector register bank 52.

Then, and as indicated by the block 66, the contents of the vector registers 3 and 4 are shuffled. And, as indicated by the block 68, a factor, referred to as a twiddle factor, is loaded to a fifth vector register, designated as vector register 5, of the vector register bank 52.

Thereafter, and as indicated by the block 70, the contents of the vector registers 4 and 5 are multiplied to the contents of the vector register 4.

Then, as indicated by the block 72, the contents of the vector registers 3 and 4 are added to the contents of the vector register 1.

Thereafter, and as indicated by the block 74, the contents of the vector register 4 are subtracted from the contents of vector register 3 and to the vector register 2. Then, and as indicated by the block 76, the contents of the vector registers 1 and 2 are stored to memory. And, the process terminates, indicated by the block 78.

Figure 4:
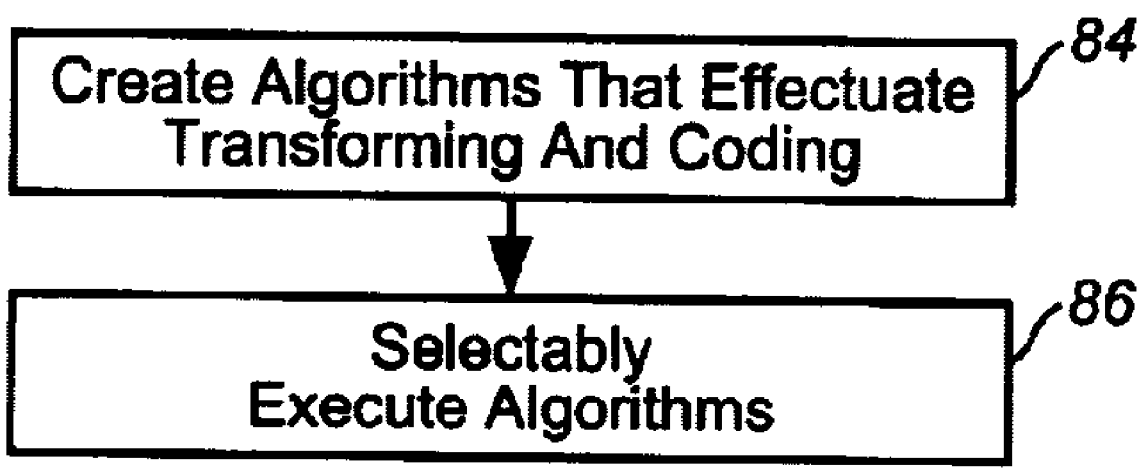
FIG. 4 illustrates a method flow diagram listing the method steps of the method of operation of operation of an embodiment of the present invention.

FIG. 4 illustrates a method, shown generally at 82, of an embodiment of the present invention. The method operates upon data at a modem. Transforming and coding of the data is performed. First, and as indicated by the block 84, algorithms that operate to effectuate the transforming and coding of the digital data are created. Then, and as indicated by the block 86, the algorithms are selectably executed by a vector processor.

The algorithms that are created are vectorized to permit their efficient execution by parallel processing devices of the vector processor.

The algorithms include, for instance, Fast Fourier Transforming and Viterbi decoding algorithms to be used by a receive part of the modem. And, the algorithms include convolutional encoding and inverse Fast Fourier Transforming of data at the modulator side part of the modem.

Because of the software implementation of the functions of the modem, modifiability of the modem is easily implemented. And, correspondingly, the scalability of the modem is also facilitated.

The previous descriptions are of preferred examples for implementing the invention, and the scope of the invention should not necessarily be limited by this description. The scope of the present invention is defined by the following claims:

The invention claimed is:

1. In a modem that selectably operates upon digital data, an improvement of apparatus for transforming and coding of the digital data, said apparatus comprising:
   an instruction memory device containing indicia associated with algorithms that operate to effectuate the transforming and coding of the digital data;
   a vector processor formed of a first processing device and at least a second processing device positioned in parallel with one another to permit parallel operation, said vector processor for executing the algorithms, indicia of which are stored at said instruction memory device, that effectuate the transforming and coding of the digital data; and
   a scalar processor coupled to said instruction memory device, said scalar processor for selectably retrieving the indicia contained at said instruction memory device and selectably providing the indicia to said vector processor, wherein said indicia are formatted according to a formatting scheme, and said scalar processor is configured to examine unclassified fields in said indicia to determine whether to forward said indicia to said vector processor for processing, or to process the indicia at the scalar processor.

2. The apparatus of claim 1 wherein the algorithms executed by said vector processor comprise vectorized algorithms, divisible into parts to be executed in parallel fashion by the first and at least second processing devices, respectively.

3. The apparatus of claim 2 wherein the vectorized algorithms executable in the parallel fashion by said vector processor comprise a first vectorized algorithm and at least a second vectorized algorithm.

4. The apparatus of claim 3 wherein the transforming comprises Fast Fourier Transforming (FFT) of the digital data, and wherein said first vectorized algorithm comprises a vectorized, fast Fourier transforming algorithm.

5. The apparatus of claim 4 wherein the coding comprises Viterbi decoding and wherein said second vectorized algorithm comprises a vectorized Viterbi decoding algorithm.

6. The apparatus of claim 3 wherein the transforming comprises Inverse Fast Fourier Transforming (IFFT) to form digital representations of the digital data and wherein said first vectorized algorithm comprises a vectorized, inverse fast Fourier transforming algorithm.

7. The apparatus of claim 6 wherein the coding comprises convolutional encoding and wherein said second vectorized algorithm comprises a vectorized convolutional encoding algorithm.

8. The apparatus of claim 1 wherein the digital data operated upon by the modem comprises originating digital data for communication upon a communication channel and terminating digital data formed responsive to termination signals provided to the modem, and wherein said instruction memory device contains indicia associated with algorithms that operate to effectuate transforming and coding of both the originating digital data and representations of the terminating digital data.

9. The apparatus of claim 1 further comprising a data memory bank coupled to receive the digital data operated upon by the modem, said data memory bank for storing the digital data and for permitting selected access thereto by said vector processor.

10. The apparatus of claim 9 wherein said scalar processor is further for addressing selected locations of the data memory bank, thereby to permit the selected access to the digital data by said scalar processor.

11. The apparatus of claim 9 further comprising a permutation network coupled to said data memory, said permutation network selectably for permutating the digital data prior to access thereof by said vector processor.

12. The apparatus of claim 11 wherein said scalar processor is further selectably for causing said permutation network to permute the digital data.

13. The apparatus of claim 11 further comprising a vector register coupled to said permutation network, said vector register for caching a selected data vector formed of digital data subsequent to permutation of the digital data by said permutation network.

14. The apparatus of claim 13 wherein said scalar processor is further selectably for identifying the selected data vector formed of the digital data cached at said vector register.

15. In a method for operating upon data at a modem, an improvement of a method for transforming and coding of the data, said method comprising:
   storing algorithms that operate to effectuate the transforming and coding of the digital data;
   storing one or more first values corresponding to data that is to be processed by a scalar processor;
   storing one or more second values corresponding to data that is to be processed by a vector processor;
   selectably executing the algorithms at a vector processor when data received at said modem includes one or more fields that correspond to said one or more second values;
   storing one or more indicia corresponding to said algorithms in a memory device; and
   forwarding said one or more indicia corresponding to said algorithms to said vector processor from a memory.

16. The method of claim 15 wherein the algorithms are vectorized algorithms.

17. The method of claim 16 wherein the transforming comprises Fast Fourier Transforming (FFT) of the digital data, and wherein the vectorized algorithms comprise fast Fourier transforming algorithms.

18. The method of claim 16 wherein the coding comprises Viterbi decoding, and wherein the vectorized algorithms comprise vectorized Viterbi decoding algorithms.

19. The method of claim 15 wherein the data comprises received data transmitted to the modem upon a radio air interface.

* * * * *